(12) United States Patent
Rhea et al.

(10) Patent No.: US 6,182,326 B1
(45) Date of Patent: Feb. 6, 2001

(54) WORKSHOP DUST COLLECTION APPARATUS AND METHOD

(75) Inventors: Steven Rhea, St. Peters; Roger Breakfield, Potosi, both of MO (US)

(73) Assignee: Emerson Electric Co., St. Louis, MO (US)

( * ) Notice: Under 35 U.S.C. 154(b), the term of this patent shall be extended for 0 days.

(21) Appl. No.: 09/247,351

(22) Filed: Feb. 10, 1999

(51) Int. Cl.$^7$ ...................................................... A47L 5/38
(52) U.S. Cl. .................. 15/314; 15/301; 285/7; 285/133.11; 285/131.1; 134/21
(58) Field of Search .................... 15/301, 314; 285/7, 285/133.11, 179, 125.1, 129.1, 131.1; 134/21

(56) References Cited

U.S. PATENT DOCUMENTS

| | | | | |
|---|---|---|---|---|
| 2,121,558 | * | 6/1938 | Coe et al. .................... | 285/133.11 |
| 2,505,303 | * | 4/1950 | Randa ........................... | 285/131.1 |
| 2,525,399 | * | 10/1950 | Collison ....................... | 137/584 |
| 2,903,088 | * | 9/1959 | Spann ........................... | 285/131.1 |
| 3,314,098 | * | 4/1967 | Carsey .......................... | 15/301 |
| 3,412,531 | * | 11/1968 | Schwab ......................... | 15/301 |
| 3,495,281 | * | 2/1970 | Palowsky ...................... | 285/129.1 |
| 3,499,669 | * | 3/1970 | Hait .............................. | 285/133.11 |
| 4,829,626 | * | 5/1989 | Harkonen et al. ............. | 15/314 |
| 4,977,638 | | 12/1990 | Best .............................. | 15/301 |
| 5,250,041 | * | 10/1993 | Folden et al. ................. | 137/68.1 |
| 5,499,882 | | 3/1996 | Waterhouse ................... | 403/171 |
| 5,509,148 | | 4/1996 | Steele et al. .................. | 4/255.01 |
| 5,606,767 | | 3/1997 | Crlenjak et al. .............. | 15/301 |
| 5,660,418 | * | 8/1997 | Crawford ...................... | 285/125.1 |
| 5,758,387 | * | 6/1998 | McNamara .................... | 15/301 |
| 5,940,926 | * | 8/1999 | Inzinna et al. ................ | 15/301 |
| 6,012,199 | * | 1/2000 | Litomisky et al. ............ | 15/301 |

OTHER PUBLICATIONS

Avallone, Eugene and Theodore Baumeister III, *Marks' Standard Handbook for Mechanical Engineers*, New York, McGraw–Hill, 1996, pp. 8–201 to 8–206.

*Instructions for Assembling Ridgid Dust Collection Network DC5000*, Form No. SP6155, Emerson Electric Co., Apr. 1998.

*Craftsman® Power and Hand Tools 1998–1999*, Sears, Roebuck & Co. 1998, p. 161.

\* cited by examiner

*Primary Examiner*—Robert J. Warden, Sr.
*Assistant Examiner*—Theresa T. Snider
(74) *Attorney, Agent, or Firm*—Howrey Simon Arnold & White, LLP

(57) ABSTRACT

Apparatus for a home workshop to collect wood dust from a plurality of locations and deposit the dust in a central container. The apparatus consists of a tubing manifold, running along the wall of the workshop, with multiple connection points for tools. The manifold contains a vacuum tee fitting that allows the vacuum source to be connected in the middle of the manifold, rather than at one of the ends, without sacrificing collection efficiency. This reduces the average length of the suction path to the tools, further enhancing collection efficiency, and allows location of the vacuum source where convenient.

17 Claims, 4 Drawing Sheets

WORKSHOP DUST COLLECTION APPARATUS AND METHOD

BACKGROUND OF THE INVENTION

1. Field of the Invention

This invention relates to the removal of wood dust and similar debris from multiple work stations within a workshop.

2. Description of the Related Art

One of the recognized hazards of working with power tools is that such tools generate considerable amounts of dust from the material being worked. In the case of most home workshops, the predominant dust material is wood dust, which the Environmental Protection Agency has classified as harmful because inhalation of wood dust can cause respiratory problems. In addition, wood dust can also cause eye irritation, and accumulation of moderate quantities of wood dust on the floor of a workshop can present a slipping hazard. The risk of dust inhalation is greatest when the tool operator stands alongside the running tool as it generates more dust.

In addition to the use of personal protective equipment such as dust masks and goggles, a number of mechanical solutions have been proposed to address the problem of workshop dust. Many of these solutions are based on the use of a suction apparatus, such as a vacuum cleaner, to draw dust away from the work station and operator. A typical solution involves the direct connection of a shop vacuum cleaner to a funnel-shaped collector affixed to the work surface of the power tool. But most workshops contain more than one tool, and it would be expensive in terms of both cost and shop space to provide a separate vacuum cleaner for each machine. It would be similarly inefficient in terms of time or effort for the operator to have to move the vacuum cleaner from machine to machine as he proceeds with the steps of a project.

A number of alternatives are known for providing dust collection systems that allow the operator to selectively apply vacuum to one or more tools from among the several in his workshop. One alternative which has generated considerable attention is the use of a rotating disc valve, as disclosed by Albert M. Best in U.S. Pat. No. 4,977,638. The valve consists of two horizontal circular plates: a fixed upper plate containing multiple vacuum inlet ports arranged in a circle about the plate, and a rotating lower plate containing a single passthrough port connected to the vacuum source. The operator selects the tool to which he wishes to apply vacuum by rotating the lower plate to align the passthrough port with one of the inlet ports in the upper plate. The inlet ports are connected individually to the tools in the workshop, which requires considerable use of rigid or flexible ducts.

A second alternative is a manifold-type vacuum distribution system such as that depicted and described in U.S. Pat. No. 5,606,767 (text column 2 and FIG. 2). This system employs a single wall-mounted main vacuum duct or manifold, with the vacuum source attached at one end. The other end of the manifold is completed with an end inlet fitting, typically a coupling or elbow, connected by flexible hose to the last tool in line along the manifold. Inlet branch fittings are provided in the manifold as needed to connect additional tools. These fittings have a straight path along the manifold and a curved branch path for admitting dust from one of the tools. The curved branch helps to prevent dust flowing from upstream in the manifold from entering the branch or depositing at its edge. Each tool is provided with an individual sliding-gate shutoff valve so that vacuum may be applied at the work surface of the tool only when required. The presence of individual valves allows the operator to operate one, several, or all of the tools in his shop at the same time, which is not possible with the rotating disc valve. However, the collection efficiency necessarily drops as vacuum is applied to each additional tool. Even with only one tool operating at a time, collection efficiency drops with increasing duct length between the vacuum source and the tool in use. Furthermore, the requirement that the vacuum source be located at the end of the manifold significantly limits the ability of the operator to arrange the tools in his workshop to his liking or to conserve space.

The present invention is directed to overcoming, or at least reducing the effects of, problems associated with the prior art.

SUMMARY OF THE INVENTION

The present invention improves the manifold dust collection system by employing a vacuum tee fitting that permits efficient flow of dust toward a vacuum source from two directions, promotes smooth merging of the two dust streams as they pass through the fitting, and inhibits dust holdup within the fitting. The shape of the vacuum tee fitting facilitates this combination of effects by diverting the flow of each dust stream to a common direction before allowing the streams to mix.

Use of a vacuum tee fitting allows a vacuum source to be connected to the manifold at any point along its length rather than exclusively at one of the ends. This option provides increased flexibility for the equipment operator in deciding where in the workshop to locate the vacuum source for optimal suction efficiency and usage of space. In certain embodiments of the invention, the efficient movement of dust is further promoted by allowing the operator to selectively shut off the air flow through large sections of the manifold when the tools connected to that section are not in use.

BRIEF DESCRIPTION OF THE DRAWINGS

Other objects and advantages of the invention will become apparent upon reading the following detailed description and upon reference to the drawings in which.

Figure 1:
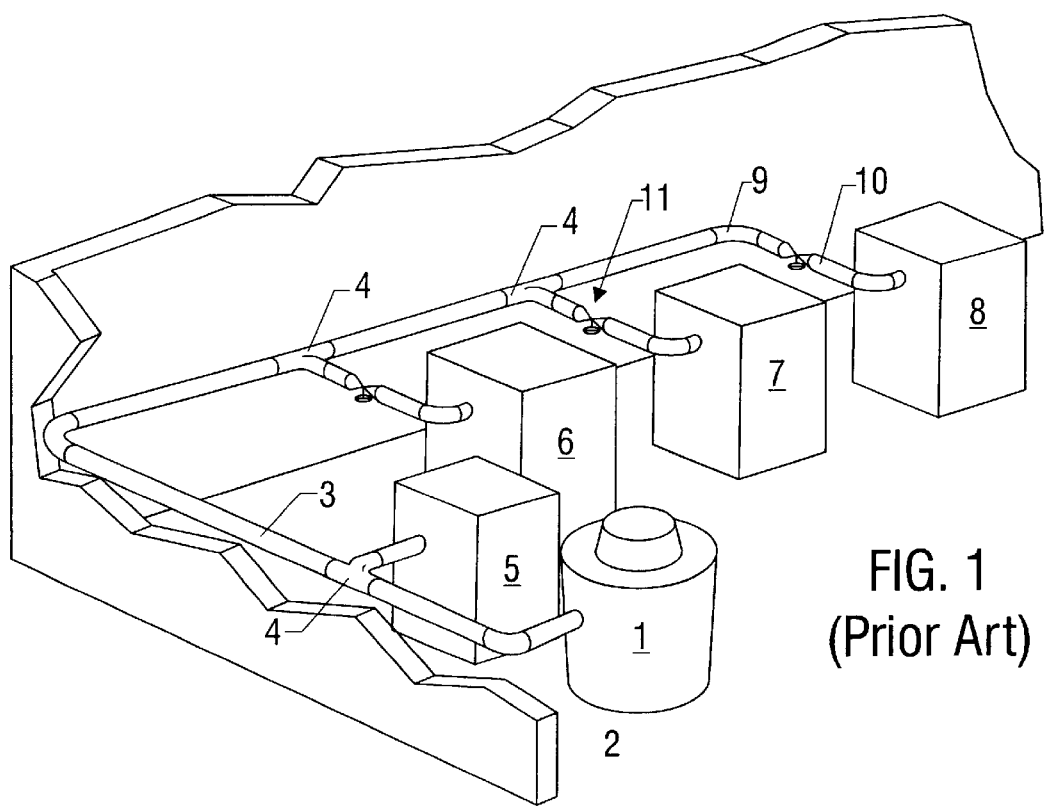
FIG. 1 depicts a plan view of a workshop using a commercially available manifold-type dust collection apparatus.
Figure 1A:
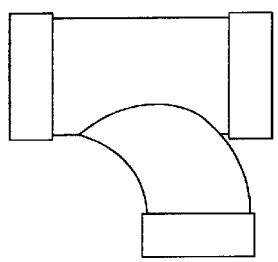

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed; but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention is directed to the problem of collecting dust from multiple work stations, such as power tools in a wood or machine shop. Specifically, the invention improves upon commercially available manifold-style dust collection systems, which typically require that the vacuum source be located at one end of the manifold, far from some of the work stations. This often results in inconvenience for the operator, occupation of premium space that might otherwise be better utilized, and significantly reduced suction efficiency at the work stations farthest from the vacuum source. The present invention allows the operator increased flexibility in determining the arrangement of the tools in his workshop. By using a vacuum tee fitting, which may be interposed at any point along the vacuum manifold, the operator obtains additional options for locating the vacuum source relative to the tools it serves. In particular, the vacuum source can be located in a corner, against a wall between two tools, or in some other space unsuitable for locating any of the tools.

The use of a vaccum tee fitting in the dust collection manifold improves dust collection efficiency in a variety of ways. By positioning the vacuum source in the middle of the vacuum manifold rather than at one end, the average duct length from the vacuum source to the tools is significantly reduced. In addition, the internal design of the vacuum tee fitting helps to prevent or reduce the holdup of dust within the collection system, both within the fitting or elsewhere in the duct. Such holdup reduces the efficiency of dust collection by reducing the effective cross-section of the duct at the holdup point, impeding the flow of air and dust to the collector. Over time this holdup may result in total blockage of a section of duct or a fitting. The use of a vacuum tee fitting addresses this need by providing a flow path that contains no sharp turns or other flow restrictions and does not permit the streams of dust to collide head-on.

The principle behind the vacuum tee fitting is that for efficient flow the streams of dust from the two inlet ports of the tee must collide in a way that does not create a turbulent or dead zone within the fitting. In an ordinary tee, the streams of dust from either side collide head-on. In the vacuum tee, the inlet dust streams are moving in substantially the same direction as they reach the center of the tee and merge smoothly as they exit the tee through the outlet port. The result is minimized holdup of dust. It will be apparent that an inlet branch fitting as described above, oriented so as to employ the side branch port as the outlet port, would be unsuitable for use as the vacuum tee fitting, because in the inlet branch fitting the dust stream flowing from one side of the tee would have to reverse direction to enter the branch. This would increase the possibility of dust holdup inside the fitting.

Some of the problems that the present invention addresses are visible in FIG. 1, which depicts the layout of a workshop employing a known manifold-type dust collection apparatus. A vacuum source (1) is connected via a flexible hose (2) to a main vacuum manifold (3). Inlet branch fittings (4) are located along the manifold in proximity to the shop tools (5, 6, 7, 8). The remote end of the main vacuum manifold is capped with an end inlet fitting (9), which in this drawing is an elbow, connected to the last tool in line. It would also be possible to use an inlet branch fitting as the end inlet fitting; this would leave an open port at the end of the branch that could be closed off with a valve or other closure until needed.

The tools are connected to the manifold with additional lengths of flexible hose or other suitable conduit (10). Some of the branches are equipped with sliding-gate valves (11) that open or close the branch to the manifold. It will be apparent to one skilled in the art that the distance from the vacuum source to tools (7) and (8) is quite long, and the efficiency of dust collection at those tools may be expected to be quite poor.

Figure 2:
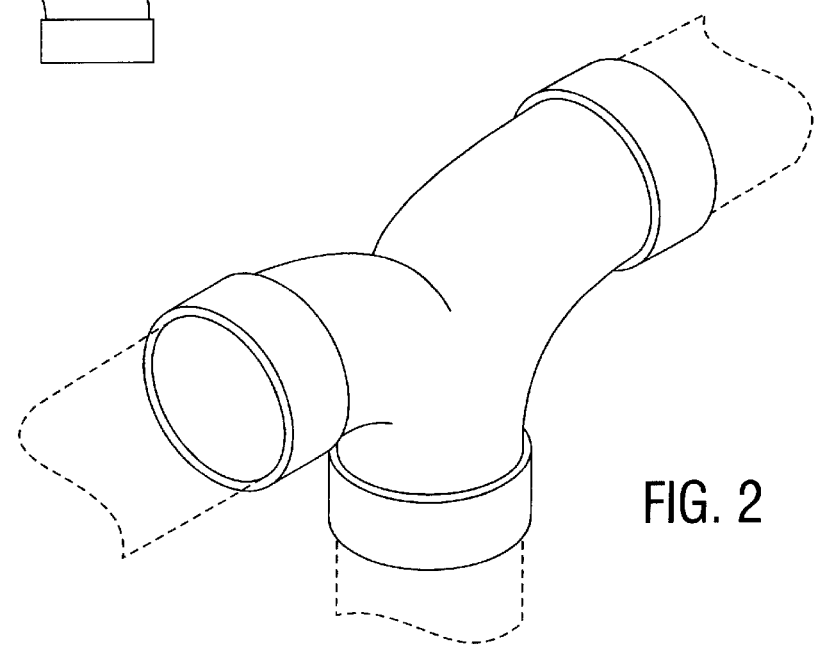
FIG. 2 depicts a drainage tee, which is one style of vacuum tee fitting suitable for use in the present invention.

FIG. 2 depicts a drainage tee, which is conceptually formed from two longradius elbow fittings fused together at one end. The shape of the tee, and particularly the curvature of the branches, make this tee especially suitable for practicing the present invention because the design significantly inhibits air flow between the two inlet ports. Although the tee shown is formed by "fusing" the elbows at an angle of 180°, it will be apparent to one skilled in the art that the function of the tee does not depend on the angle, and that a similar tee that is formed at a smaller angle, such as 90 degrees or even 30 degrees, would accomplish the same result.

Figure 3:
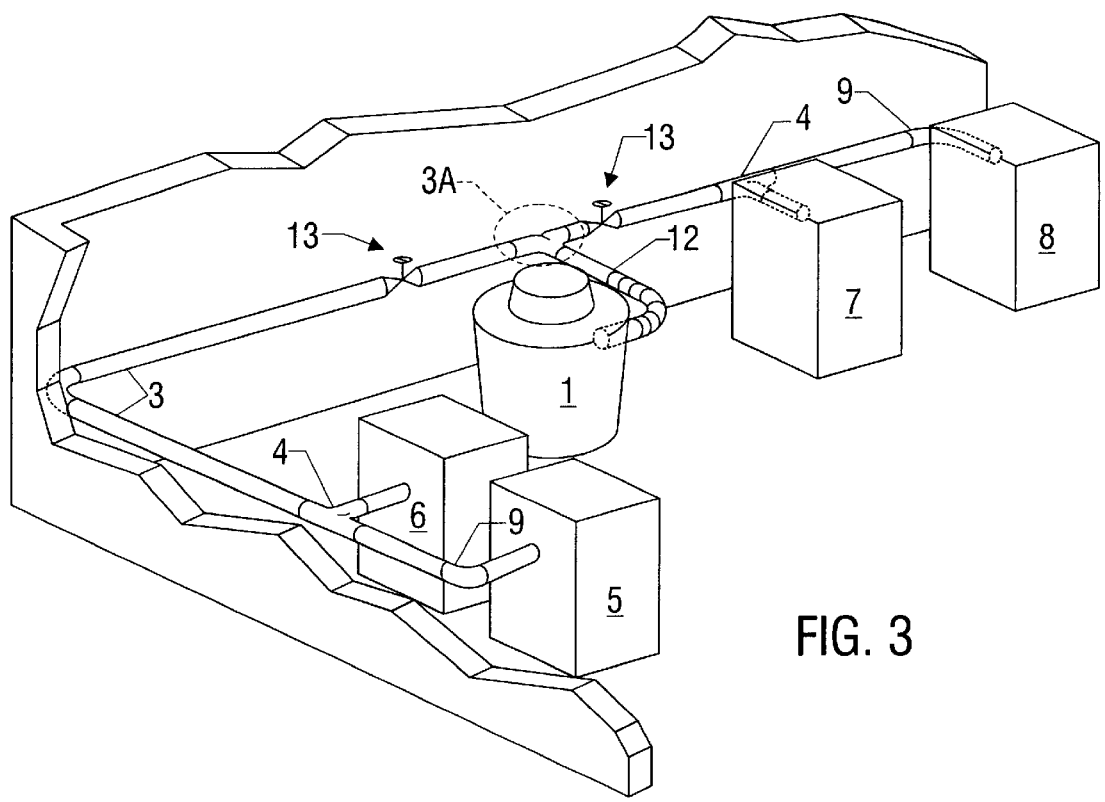
FIG. 3 depicts a plan view of the same workshop as FIG. 1, but using a drainage tee according to the present invention to locate the vacuum source between two of the tools along the wall of the shop.
Figure 3A:
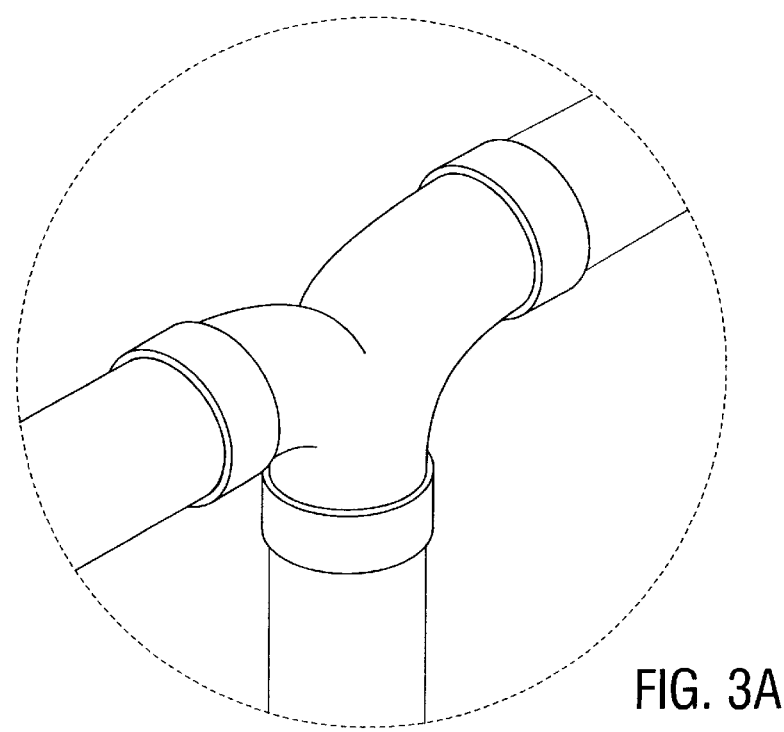

FIG. 3 depicts a vacuum apparatus constructed according to the present invention and demonstrates how the present invention solves the problem posed in FIG. 1. Interposing the vacuum tee (12) into the middle of the manifold shortens the duct length to three of the tools (6, 7, 8), thereby improving the efficiency of collection at each inlet.

FIG. 3 also shows how it is possible to increase vacuum efficiency still further by interposing a valve (13) in the manifold duct on either side of the vacuum tee, which allows the operator to shut off an entire section of the manifold. A particularly suitable valve for this purpose is a sliding-gate valve, but other valve designs that do not substantially restrict the flow cross-section of the valve, such as ball or butterfly valves, would also be suitable.

Figure 4:
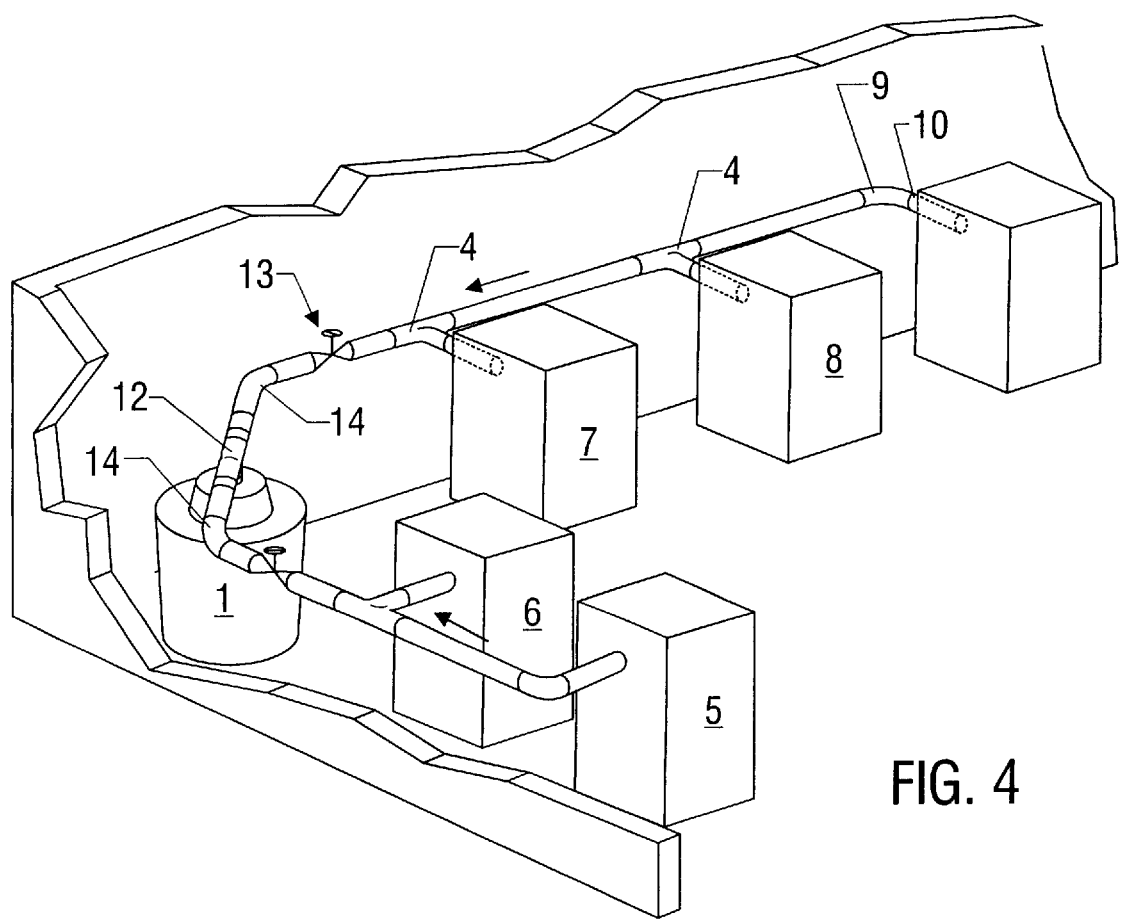
FIG. 4 depicts a plan view of the same workshop as FIG. 1, but using a drainage tee according to the present invention to locate the vacuum source in the corner of the shop.

FIG. 4 depicts another embodiment of the present invention. In this embodiment, the invention is applied to permit placement of the vacuum source in the comer of the room. In the example presented here, the inlet ports of the vacuum tee are oriented at a 45° angle with respect to the walls, and additional 45° elbow fittings (14) are employed to adapt to the manifolds running along the two adjacent walls. It will be apparent that many other combinations of port orientation angle and elbow fittings may be employed with similar effect.

Figure 5:
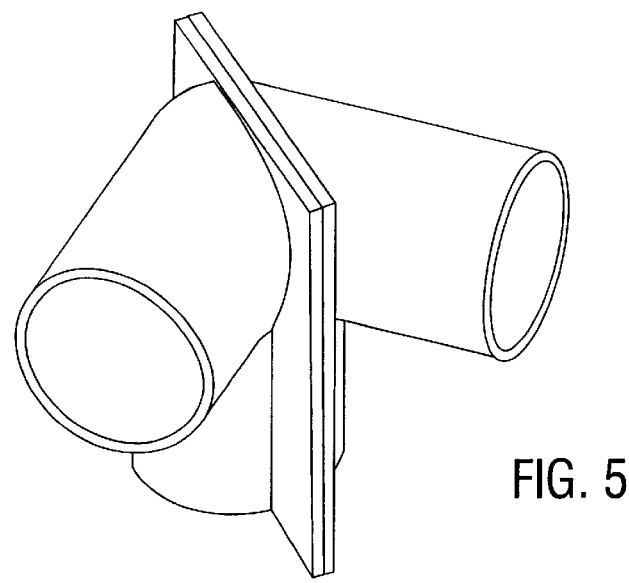
FIG. 5 depicts a three-way elbow, which is another style of vacuum tee fitting suitable for use in the present invention.

FIG. 5 depicts a three-way elbow (sometimes called a side branch elbow), which is another vacuum tee fitting satisfying the requirements of the present invention. The three ports of the three-way elbow (the two inlet ports and the outlet port) are substantially perpendicular to one another. As in the case of the drainage tee, it will be apparent that although a 90° angle between inlet ports is preferred in the present invention, one having the benefit of this disclosure could construct a fitting with either a greater or smaller angle that would function identically.

Figure 6:
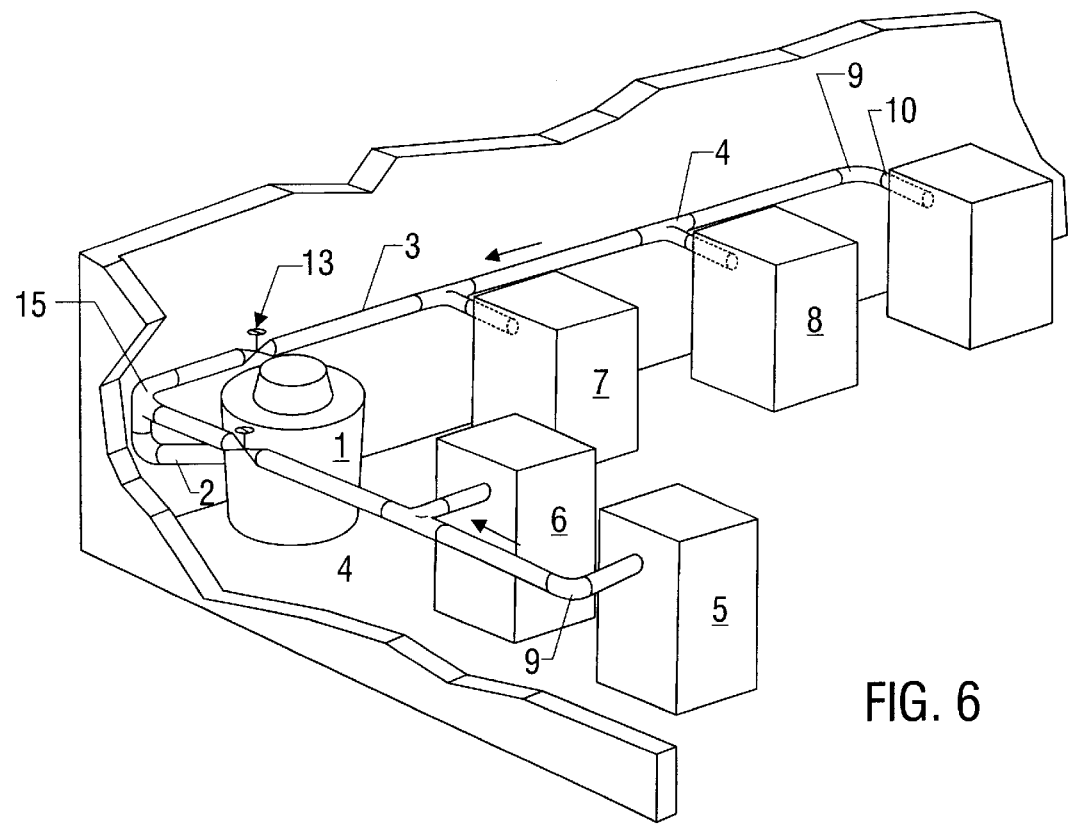
FIG. 6 depicts a plan view of the same workshop as FIG. 1, but using a side branch elbow according to the present invention to locate the vacuum source in the corner of the shop.

FIG. 6 depicts an embodiment of the present invention in which a 90-degree three-way elbow (15) is employed to place the vacuum source in the corner of the workshop. One advantage of this embodiment of the invention is that no additional fittings are needed to bring the inlet ports of the tee into alignment with the walls of the shop.

It will be apparent to one of ordinary skill in the art that many changes or modifications may be made to the invention described above without departing from the spirit or scope of the appended claims.

What is claimed is:

1. An apparatus for collecting wood dust and the like from a plurality of dust collection points, said apparatus comprising:
    (a) a vacuum tee fitting comprising two inlet ports and one outlet port adapted for connection to a vacuum source, each said inlet port oriented approximately perpendicular to said outlet port, said ports arranged so as to direct the flow of air through the fitting substantially from each inlet port toward the outlet port and to impede the flow of air from one inlet port to the other inlet port; and
    (b) a plurality of tube manifolds, each of said tube manifolds connected to an inlet port of said vacuum tee fitting, each said tube manifold comprising a first manifold conduit and an end inlet fitting located in proximity to a dust collection point.

2. The apparatus of claim 1 further comprising a valve connected to at least one of said end inlet fittings.

3. The apparatus of claim 1 further comprising a first vacuum conduit connecting one of said end inlet fittings to a dust collection point.

4. The apparatus of claim 1 wherein at least one of said tube manifolds further comprises:
    an inlet branch fitting, which comprises a straight airflow path and a side inlet branch; and
    a second manifold conduit connecting said inlet branch fitting and said end inlet fitting to form a continuous air flow path.

5. The apparatus of claim 4 wherein a second vacuum conduit connects the side inlet branch of said inlet branch fitting to said dust collection point.

6. The apparatus of claim 4 further comprising a valve connected to said inlet branch fitting.

7. The apparatus of claim 4 wherein at least one of said tube manifolds further comprises a vacuum shutoff valve interposed between the inlet port of said vacuum tee fitting and the next closest inlet branch fitting or end inlet fitting on said manifold.

8. The apparatus of claim 1 wherein the air flow path between each inlet port of the vacuum tee fitting and the outlet port is curved away from the other inlet port to impede the flow of air between the inlet ports.

9. The apparatus of claim 8 wherein the air flow path from each inlet port to the outlet port of the vacuum tee fitting describes a smooth arc.

10. The apparatus of claim 9 wherein both of said smooth arcs lie in a common plane.

11. The apparatus of claim 9 wherein said smooth arcs lie in perpendicular planes.

12. The apparatus of claim 1 wherein the flow of air between the inlet ports of the vacuum tee fitting is impeded by orienting said inlet ports approximately perpendicularly with respect to one another.

13. The apparatus of claim 1 further comprising a vacuum source.

14. The apparatus of claim 13 wherein the vacuum source comprises a wet/dry vacuum cleaner.

15. The apparatus of claim 13 wherein a shutoff valve is interposed between at least one inlet port of said vacuum tee fitting and an adjacent manifold tube.

16. An improved apparatus for collecting dust by vacuum suction from a plurality of work stations, wherein said apparatus includes a vacuum source; a manifold of tubes joined by inlet branch fittings, each of said inlet branch fittings including an airflow path along the manifold and a side inlet branch; a vacuum conduit connecting the vacuum source to the manifold; and a plurality of vacuum conduits each connecting one of said side inlet branches to a dust collection point, and the improvement comprises
    an air pathway connecting the vacuum source to the manifold through a vacuum tee fitting comprising two inlet ports and one outlet port, said ports arranged so as to direct the flow of air through the vacuum tee fitting substantially from both inlet ports to the outlet port and to impede the flow of air between the two inlet ports,
    wherein said vacuum tee fitting is located between two tubes of said manifold such that there is air flow toward the vacuum source from both ends of the manifold.

17. A method for removing wood dust and the like from a plurality of work stations, said method comprising
    affixing a tube manifold to a plurality of rigid surfaces in proximity to the work stations, said tube manifold comprising two end inlet fittings, a plurality of inlet branch fittings, each of which comprises a straight airflow path and a side inlet branch, and a plurality of vacuum conduits connecting said end inlet fittings and inlet branch fittings to form a continuous air flow path;
    interposing a vacuum tee fitting into the manifold between two of the inlet branch fittings, said vacuum tee fitting comprising two inlet ports and one outlet port, and said ports arranged so as to direct the flow of air through the vacuum tee fitting substantially from both inlet ports to the outlet port and to impede the flow of air between the two inlet ports;
    locating a vacuum source between two of the work stations;
    connecting a source conduit from the vacuum source to the outlet port of the vacuum tee fitting;
    connecting a vacuum conduit from an inlet point on the manifold to a dust collection point on each of the work stations, said inlet point comprising either an end inlet fitting or an inlet branch fitting; and
    operating the vacuum source to withdraw dust from the dust collection point of at least one of said work stations and through said vacuum conduit, said inlet point, and said manifold.

\* \* \* \* \*